July 9, 1957 L. G. ALEXANDER 2,798,614
FILTERING MEDIUMS
Filed Dec. 11, 1953
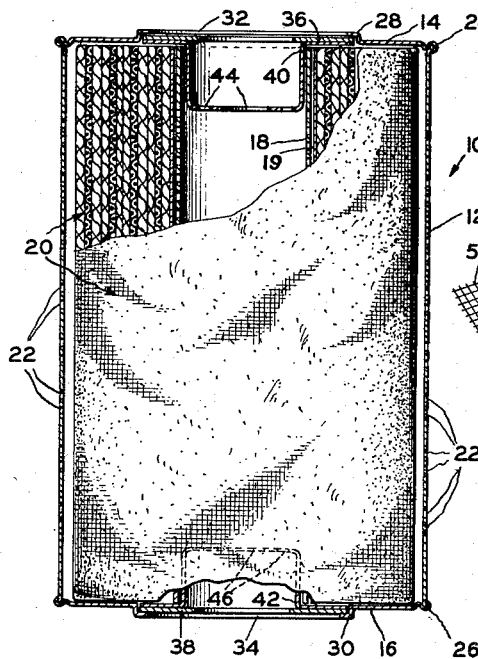
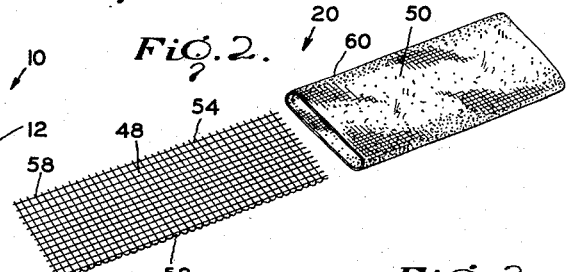
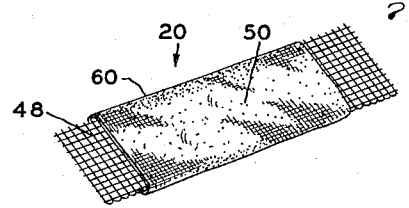
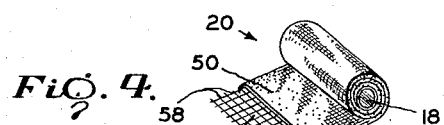
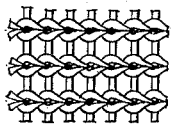
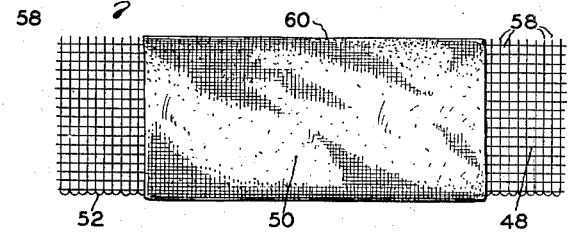
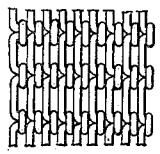
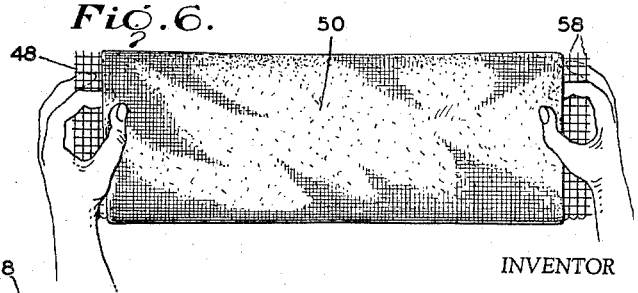
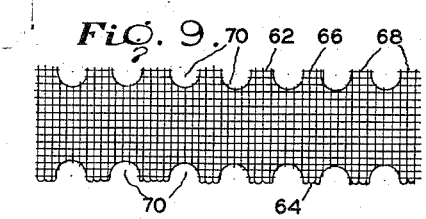
INVENTOR
Leon G. Alexander
BY Shoemaker & Mattare
ATTORNEYS United States Patent Office 2,798,614
Patented July 9, 1957

2,798,614

FILTERING MEDIUMS

Leon G. Alexander, Charlotte, N. C., assignor to Wix Corporation, Gastonia, N. C., a corporation of North Carolina Application December 11, 1953, Serial No. 397,546

6 Claims. (Cl. 210—487)

The present invention relates to improvements in filtering media and more particularly to a filtering medium of an improved nature wherein the flow characteristics thereof may easily be varied in the make-up of filter cartridges and the like.

The primary object of the present invention is to provide an improved filtering medium wherein the porosity of the filtering medium is controllable and may be substantially varied so as to impart thereto desired filtering flow characteristics.

A further object of the present invention is to provide an improved filtering medium wherein the filtering material is so formed as to have predeterminately spaced openings therethrough which material can be supported on a suitable support with the size of the openings through the filtering material adjustable by varying the relationship between the filtering material and its support.

A still further object of the present invention is to provide an improved filtering medium wherein an adjustable porosity is provided by a knitted element which can be in sheet or tube form, which sheet or tube is carried by a support, the tube or sheet being stretched relative to the support to achieve the desired porosity.

Another object of the present invention is to provide an improved filtering medium wherein knitted material is employed, which material is carried by a suitable perforate support and wherein either the knitted or purled side of the material can be disposed in contact with the support so as to vary the flow characteristics through the filtering medium.

A still further object of the present invention is to provide an improved arrangement wherein a sleeve-like knitted filtering element can be engaged over a perforate support and the assembly compactly rolled to provide a filter cartridge of the replaceable type.

A still further object of the present invention is to provide an improved arrangement of filtering element and support wherein the support has at least an edge portion thereof so formed as to facilitate fixing of the stretched adjustment of the filtering element thereon.

Various other objects and advantages will become apparent from the detailed description to follow.

The best form in which I have contemplated applying my invention is clearly illustrated in the accompanying drawings wherein:

Fig. 1 is a side elevational view of a replaceable type filter cartridge employing the filtering medium of the present invention, parts being broken away and parts in section;

Fig. 2 is an exploded perspective view showing the filtering element and support therefor which comprise the elements of the present invention;

Fig. 3 is a perspective view showing the filtering element mounted on its support;

Fig. 4 shows the filtering medium of Fig. 3 in partially rolled relationship;

Fig. 5 is a plan view of the filtering element on its support and in unstretched relationship;

Fig. 6 is a view similar to Fig. 5 wherein the filtering element has been stretched so as to give porosity differing from that in the relationship of Fig. 5;

Fig. 7 is a fragmental view of the filtering element showing the knitted side thereof which gives a ribbed effect;

Fig. 8 is a view similar to Fig. 7 but showing the purled side of the filtering material; and Fig. 9 is a plan view of a modified form of support element.

Referring more particularly to the drawings, it will be seen that a replaceable type filter cartridge 10 is shown in Fig. 1 as comprising a casing 12 having upper and lower closure discs 14 and 16, a central foraminous core 18 and a filtering medium 20, wrapped around cloth sleeve 19 and core 18.

As shown, the cartridge housing 12 is of cylindrical form and is provided with a multiplicity of apertures as 22. The upper and lower end closure discs 14 and 16 are secured to the cylindrical housing wall along its upper and lower edges in a conventional fashion as at the seams 24 and 26. The discs 14 and 16 have centrally offset portions 28 and 30, as is conventional, and these offset portions are provided with large openings 32 and 34 which cooperate with the conventional casing for the filter cartridge, as in fuel, oil and hydraulic systems. Within each of the offset portions 28 and 30 is conventionally disposed a gasket 36 or 38 of annular form, each of the gaskets abutting against a cup-like element 40 or 42 the bottoms of which are apertured at 44 and 46, as is conventional. The core 18 is of cylindrical form but of substantially smaller cross sectional area than the outer cylindrical wall but is similarly perforated to permit passage of the fluid being filtered by the filtering medium 20.

The filtering medium 20 is comprised of a support element 48 and a filtering element 50. The support element 48 is formed of a wire mesh because of its thinness and stiff yet pliable characteristics and also because it is free to pass the fluid to be filtered therethrough. The support may be made from suitable material made foraminous by perforating in any suitable manner as by punching, pricking and the like, and such material may comprise plastic, paper or other suitable material. As here shown, the wire mesh has one edge as 52 folded over so as to provide a substantially smooth finished edge over which the filtering material can easily be slid. The opposing edge 54 is cut so as to leave free wire ends as at 58.

The filtering element 50 is as shown comprised of a sheeting of knitted soft cotton yarn or roving preferably formed as a sleeve of a width when flat predeterminately related to the width of the support element 48. As shown in Fig. 3, the filtering element 50 is engaged over the support 48. To do so, the edge 60 of the filtering element is held away from the edge 58 of the support by transverse stretching until the filtering element is fully engaged on the support 48 (see Fig. 5). If it is desired to have a very high flow rate through the filtering medium the filter sleeve 50 is disengaged from the side edge 58 of the support 48 and stretched as in Fig. 6 to the desired amount at which point the edge 60 of the filtering element is permitted to engage the free wire ends 58 of the edge 54 of the support 48 so as to be housed thereby in adjusted relationship.

Next, the core 18 is positioned at one end of the assembly and the assembly is rolled on the core 18 in the manner shown in Fig. 4. After being rolled in this fashion, the assembly is inserted into the housing of the cartridge 10 and is ready for use.

From the foregoing, it will be seen that in order to vary the flow characteristics through the filtering medium of the cartridge 10 it is only necessary to vary the width of the sleeve 50 relative to its support 48 so as to vary the transverse stretching of the sleeve. Additionally, the sleeve may be stretched longitudinally relative to the support to further vary the porosity of the sleeve and thus the flow characteristics through the assembled relationship. Still further variations in the flow characteristics of the filtering medium can be obtained by either knitting or purling the yarn from which the filter sleeve is made. Of course, either the knitted or purled side can be exposed when the filter element is mounted on its support.

In Fig. 9, a modified form of support 62 is shown. Support 62 is formed of wire mesh and has one of its edges 64 finished so as to be substantially smooth while its opposing edge 66 is cut so as to leave free wire ends 68 as in the previously described embodiment. However, in this embodiment, the wire mesh is provided throughout its length with predeterminately spaced cutaway portions as at 70 on each side thereof. With such an arrangement and with a filtering sleeve or sheet carried thereby flow characteristics differing from the arrangements above described will be obtained.

It will be understood that while the foregoing description discloses the utilization of the filtering medium of the present invention in a housing of a replaceable type filter cartridge, the filtering medium can be used by itself, the sleeve wrapped around a center core, or it can be enclosed in a can, a wrapper, a cloth, or a knitted sleeve. Furthermore, while particularly adapted for filtering such fluids as oil and fuel in automotive systems, the filtering medium of the present invention can be used for filtration of any contaminated fluid wherein the fluid has no deleterious effect on the knitted material.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A filtering medium for fluids comprising a support through which the fluid can pass, a sheeting comprised of a knitted filtration material, said sheeting being carried by said support and adapted to be elongated by stretching whereby the size of the openings defined by the knitted material may be predeterminately set according to the desired flow characteristics, said support being constructed of foraminous material and being of substantially rectangular shape with side edges thereof provided with cut-away portions, said sheeting being sleeve-like and receiving the support therein and means between said cut-away portions for securing the sheeting in stretched condition on the support.

2. A filtering medium for fluids comprising an elongate flat relatively stiff support body of foraminous structure through which the fluid can pass, a sleeve-like sheeting comprised of a relatively loosely knitted filtration material having fluid passing openings, said sleeve-like sheeting being open at its ends and having said support body extending therethrough, the sleeve-like sheeting being carried by the body and lying snugly against the sides of the body and secured thereto long a line extending longitudinally of the body to maintain a desired size of the openings defined by the knitted material whereby the desired flow characteristics are obtained.

3. A filtering medium for fluids comprising a flat support through which the fluid can pass, a sheeting material made up of knitted material suitable for filtration and having fluid passing interstices therethrough, said sheeting being initially shorter than and carried by said support and adapted for stretching adjustment thereon whereby changes in the size of the interstices are effected to obtain desired flow characteristics, and means carried by the support engaging a portion of said sheeting and retaining the sheeting in substantially fixed adjusted relationship with the support.

4. A filtering medium for fluids comprising a support through which the fluid can pass, a sheeting of knitted material carried on the support and suitable for filtration, said sheeting having a multiplicity of fluid passing interstices therethrough, said sheeting being in stretched condition on said support to maintain the size of the interstices predeterminately set to obtain desired flow characteristics, said support being constructed of wire mesh fabric at least an edge portion of which has free wire ends projecting therefrom and maintaining the sheeting on the support in said stretched adjustment with relation to the support.

5. A filtering medium for fluids comprising an elongate flat sheet of wire fabric having longitudinal and transverse interwoven wires, the transverse wires having their ends along at least one longitudinal edge of the sheet projecting beyond the adjacent bordering longitudinal wire, and an elongate flat sleeve of fibrous filtering material having an initial length less than the length of the wire fabric sheet and having said wire fabric sheet extending therethrough, said sleeve being retained in flat condition by the wire fabric sheet and the said projecting ends of the transverse wires forming holding points penetrating the sleeve material and securing the sleeve in place on the wire fabric sheet.

6. A filter element adapted to be formed into a tubular roll for use, said element prior to being so formed comprising a long supporting sheet of foraminous material and an elongate sleeve of knitted fibrous filtering material having an initial unstretched length materially less than the length of the supporting sheet, the supporting sheet extending through the sleeve and retaining the sleeve flat against the sides of the sheet, the supporting sheet being of a thickness approximately the same as that of the knitted material whereby the element when formed into a tubular roll for use forms a compact structure through which liquid to be filtered may pass radially of the roll through the interstices of the knitted material and through the foraminous supporting sheet, and a multiplicity of pointed elements forming parts of the supporting sheet and hooked into the knitted material and retaining the sleeve in a set position on the sheet.

References Cited in the file of this patent

UNITED STATES PATENTS

| 1,791,046 | Sweetland | Feb. 3, 1931 |
| 2,255,937 | McNamara | Sept. 16, 1941 |
| 2,345,849 | Winslow et al. | Apr. 4, 1944 |
| 2,463,929 | West | Mar. 8, 1949 |
| 2,530,283 | Brown | Nov. 14, 1950 |